United States Patent Office 3,207,641
Patented Sept. 21, 1965

3,207,641
PROCESS FOR COATING A REINFORCING ELEMENT WITH A POLYFUNCTIONAL MONOMER, APPLYING A RESINIFIABLE MIXTURE AND LAMINATING
Augustus B. Small and Byron M. Vanderbilt, Westfield, and Joseph P. Simko, Jr., Highland Park, N.J., assignors to Esso Research and Engineering Company, a corporation of Delaware
No Drawing. Filed Oct. 11, 1960, Ser. No. 61,824
11 Claims. (Cl. 156—172)

The instant invention relates to a polyfunctional coating which is applied to a reinforcing element with a previous coating of an unsaturated organic silane thereon. More particularly, it is concerned with an improved reinforced plastic therefrom.

It is known to provide a reinforced plastic laminate, such as a polyester laminate and a polydiolefin laminate, in which the reinforcing element, such as glass fiber, therein is coated with a vinyl silane. In the past, however, this vinyl silane polymerizes relatively slowly and under normal curing conditions, the reaction of this silane with the laminating resin is incomplete. This is a serious problem commercially since the reinforced plastic which results therefrom has poor resistance to water and other aqueous liquids. This results in premature failure when used as piping, tanks, and other vessels which are used for handling these aqueous liquids.

It has been discovered herein that the aforementioned problem can be alleviated to a high degree by applying a second coating of a polyfunctional monomer to the vinyl silane-coating reinforcing element before it is impregnated with the thermosetting resin. Thus, in accordance with one embodiment of this invention, a reinforcing element, e.g., glass fiber, is provided with a first coating of an unsaturated organic silane thereon. On top of this coated element, a second coating is added thereto which comprises a polyfunctional monomer, e.g., divinyl benzene, ethylene dimethacrylate, or the like. The reinforcing element with the two coatings thereon is subsequently impregnated with a resinifiable polymeric mix and cured to provide a hard, unitary reinforced plastic composition therefrom. A plurality of reinforcing elements similarly treated may be arranged in layers to provide a corresponding laminate structure.

The reinforcing elements that are applicable to this invention include such items as mineral materials, e.g., glass, bestos, mica, rock, and celite; vegetable materials, e.g., cotton, linen, rayon, and silk; organic materials, e.g., hair, nylon, and Orlon; and metallic materials, e.g., iron, aluminum, and copper. Reinforcing elements generally comprise 80% by weight of the reinforced plastic, preferably 35 to 80%. However, the preferred material is glass fiber. In accordance with this invention, glass fiber is defined as any fibrous glass unit to include filament yarns, roving, reinforcing mats, staple yarns, woven fabrics, and chopped fibers. A protective size may or may not be applied to glass fibers. Examples of sizes which can be used are as follows: polyesters; polyvinyl acetate; rubbers, such as, polyisoprene, copolymers of isobutylene with isoprene, and copolymers of butadiene with styrene. It is preferable, although not essential, to remove the sizing in many cases prior to contacting the glass with the resin. This invention is also applicable to finely divided fillers such as silica, clays, carbonates, finely ground glass, and the like which have been coated with vinyl silane or its equivalent.

In this invention the reinforcing element, e.g., glass fiber, is firstly coated by treating with an unsaturated organic silane, which has the general formula $$R_nSi(OR_1)_{4-n}$$

wherein R is an unsaturated aliphatic group (alkenyl) containing a terminal ethylenically unsaturated carbon to carbon linkage, e.g., vinyl, allyl, or methallyl group; $n$ is a positive integer equal to 1, 2, or 3; and $R_1$ is hydrogen, an alkyl or aryl group or simple substituted derivatives thereof. This silane coating is preferably monomolecular in thickness, but it is also effective as a polymolecular film either as the silane or as the siloxane. Suitable silanes include vinyl silane applied as the silanol from aqueous solution or as the trichloride from hydrocarbon solution. Other suitable silanes include divinyl silane, vinyl dimethyl silane, allyl silane, and vinyl monomethyl silane. Although use of an unsaturated silane is preferred, coordinated compounds of methacrylic acid and chromium, such as the commercial glass finish Volan, is also useful.

In the instant invention, a second coating is applied to the fibers with the silane thereon. This coating is a polyfunctional monomer i.e., a poly-ethylenically unsaturated monomer containing at least 2 alkenyl groups each of which contains a terminal ethylenically unsaturated carbon to carbon linkage which includes divinyl benzene, ethylene dimethacrylate, trivinyl benzene, triethylene dimethacrylate, ethylene diacrylate, diallyl fumarate, propane trimethacrylate, and triallyl cyanurate. However, the polyvinyl benzenes and the methacrylates are preferred. This second coating has a thickness within the range of one molecular layer up to many molecules thick and can be applied thereon by any one of several satisfactory methods. One suitable procedure is to prepare a 1 to 20% solution of the polyfunctional monomer, e.g., divinyl benzene with a solvent such as ethyl ether, acetone, methyl alcohol, and the like. A peroxide catalyst such as benzoyl peroxide, methyl ethyl ketone peroxide, dicumyl peroxide, and the like may be included in this solution within a weight percent range of 0.5 to 3%. This final solution can be applied to the vinyl silane-coated reinforcing element, e.g., glass cloth, at ordinary temperature and subsequently allowed to stand at ordinary temperature in a non-oxidizing atmosphere such as nitrogen. Alternatively, it may be heated at temperatures up to about 250° F., depending upon the catalyst used to polymerize a part of the polyene with the vinyl silane leaving a part of the unsaturation to react with the resin. The coated glass cloth therefrom can then be impregnated with a resinifiable mix. Another appropriate method is to form a concentrated blend of polyfunctional monomer, e.g, ethylene dimethacrylate in a part of the monofunctional monomer which is used in the resin mix. This blend is then used to wet glass fibers. The glass tends to adsorb preferentially the polyolefinic monomer from such a concentrated solution. The glass fibers can then be impregnated with the remainder of the resin mix. It is also possible herein to use heat-cleaned glass and apply the vinyl silane as an ester in the dimethacrylate solution. It is also feasible to hydrolyze the silane ester in the resin solution by adding up to a stoichiometric amount of water to the solution prior to addition to the glass.

Curable polymers in the mix within the purview of this invention comprise thermosetting resins which are set by free radical or peroxide type catalysts, e.g., polydienes, polyesters, and monomeric styrene containing a polyene such as divinyl benzene with or without a thickening agent such as natural rubber. The preferred polymeric oils included in the resinifiable mix in this invention are prepared from conjugated diolefins, which have 4 to 6 carbon atoms per molecule, e.g., butadiene, isoprene, piperylene, n-hexadiene, dimethyl butadiene, and methyl pentadiene. Such diolefins may be copolymerized with minor amounts of ethylenically unsaturated monomers, e.g. styrene, acrylonitrile, methyl vinyl ketone, or with styrenes having alkyl groups substituted on the ring, e.g. paramethyl styrene, and dimethyl styrene. A preferred diolefin polymeric oil is one prepared by reacting 75 to 100 parts of butadiene and 25 to 0 parts of styrene in the presence of metallic sodium catalyst. This, therefore, includes the homopolymer of butadiene and the copolymers of butadiene with styrene. Polymerization is carried out in a reaction diluent at temperatures from about 25° C. to 105° C. with about 0.5 to 5 parts of finely divided sodium per 100 parts of monomers used. The diluent used in the polymerization must boil between about −15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane-1,4 and diethyl ether. Finally, it is beneficial to use about 5 to 35 weight percent, based on sodium, of an alcohol such as methanol, isopropanol, or an amyl alcohol in order to overcome the initial induction period. The resulting product may vary in viscosity from 0.15 to 20 poises when tested as a 50% solution in Varsol. The preparation of this oil in the presence of an alkali metal or peroxide catalyst is described in U.S. Patents 2,762,851 and 2,586,594, which are incorporated herein by reference.

Besides the curable polydiolefin heretofore described, this resinifiable mix may also contain monomeric crosslinking agents. Such monomers include the vinyl aromatics, such as, styrene, the vinyl toluenes, the dimethyl styrenes, the halogenated styrenes, e.g., 2,4-dichlorostyrene; acrylic and methacrylic acid esters of monohydric alcohols, such as, butyl methacrylate; alkyl fumarates, such as, diethyl fumarate; and allyl esters, such as, diallyl phthalate; and vinyl esters, such as, vinyl stearate; an acrylic acid ester of a polyhydric alcohol, and mixtures thereof. These additional crosslinking agents may be present within the range of 0 to 70% of the curable liquid mix, preferably 40 to 50%.

A catalyst is also incorporated in the resinifiable mix within the range of 0.5 to 10 parts, preferably 2 to 4 parts. The catalyst is advantageously a free radical or peroxide type such as dialkyl or aralkyl peroxides, e.g., dicumyl peroxide and ditertiary butyl peroxide; and alkyl perester peroxides, e.g., ditertiary butyl diperphthalate and tertiary butyl perbenzoate. A mixed catalyst consisting of dicumyl peroxide and ditertiary butyl peroxide is preferred. Benzoyl peroxide may also be employed in the mix, preferably in 0.5 to 1.0% concentration.

It is also feasible to incorporate various other types of materials in the aforementioned mix. For example, a hindered or blocked phenol, e.g., 2,6-di-t-butyl-p-cresol, can be included with the range of 0.1 to 2 parts phm. (per 100 parts of mix). Such phenols act as age resistors or oxidation inhibitors, and do not appreciably slow the cure rate of the resin. Divinyl benzene or other polyolefinic compounds can comprise 2 to 25 phm. Furthermore, natural rubber, synthetic polyisoprenes, and other rubbery polymers are frequently incorporated into the mix, and, if employed, the amount will vary between about 1 and 10 phm. It is also noteworthy that 0.05 to 2 parts of the unsaturated silanes as esters may be added to the instant resinifiable mix.

The reinforcing elements heretofore described may then be laminated by admixture with the resinifiable polymer mix. A laminate is defined herein as a composite mass of layers of reinforcing elements bonded with a thermosetting resin. Such layers may be composed of cloth and resin, continuous fibers, such as roving, strand or braid saturated with resin and employed in layers or they may be directly wound fibers in layers to form structures such as pipe, tanks, spheres and the like. The fabrication can be accomplished by well known procedures. For example, the resinifiable polymer mix can be combined with glass cloth by brush impregnation, by pouring into the center of several plies of dry cloth assembled on cellophane-covered glass plate, or by dipping the cloth into the resinifiable polymer mix and forming two or more layers of impregnated cloth into a laminate. Composite compositions, in useable forms, are also obtained by admixing, spraying, dipping or otherwise impregnating chopped fibers or roving as reinforcing elements with resinifiable polymer mix followed by curing the mix to obtain the thermoset reinforced resinous compositions.

Thus, one method used in the manufacture of solid rectangular sheets, is to form layers of curable polymer mix and glass fiber. After the desired thickness is obtained, the sheet is cured to a unitary reinforced plastic. Another method can be used for the manufacture of cylindrical hollow pipes. Glass fibers can be dipped in the curable polymer mix and wound about a steel mandrel. The fiber rovings, e.g., glass fibers, are wound at an angle to the axis of the mandrel circumferentially in superimposed layers to form a peripheral shell of the pipe. After the desired shape is obtained, the wrapping can be cured to form the unitary rigid pipe.

The reinforcing element with the two coatings thereon, which has been impregnated with the desired resinifiable mix, is subsequently cured to a reinforced resinous composition. A suitable, but not the only method, is by baking in a press mold at a temperature range of 250 to 400° F. for between 3 minutes and 2 hours under pressures from 0 to 1500 p.s.i.g. It may also be advantageous to provide a post cure between 300 and 350° F. for ½ to 2 hours.

Thus, in accordance with the present invention, an end product is provided, which is an improved reinforced plastic laminate or other structure depending on the specific method of fabrication employed. The physical properties are superior to those which are obtained by employing a reinforcing element which does not have a coating of a polyfunctional monomer thereon. Because of the increased water resistance of the reinforced plastic structures prepared by the instant technique, it is particularly applicable in the constructing of pipes, tanks, and the like which are buried in moist earth and/or are used for handling aqueous fluids at ordinary and elevated temperatures.

The following examples are submitted to illustrate but not to limit this invention. Unless otherwise indicated, all parts and percentages in the specification are based upon weight.

EXAMPLE I

A polymeric oil was provided from the compounds indicated herebelow:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity 49.0; flash, 105° F.; boiling range, 150° to 200° C.; solvent power, 33–37 kauri-butanol value (reference scale: Benzene 100 K.B. value, n-heptane 25.4 K.B. value).
[2] Dispersed to a particle size of 10 to 50 microns by means of an Eppenbach homo-mixer.

The polymerization was performed at 50° C. in a 2-liter autoclave equipped with a mechanical agitator. Complete conversion was obtained in 4.5 hours. The catalyst was destroyed and removed from the resulting crude product. Essentially all of the solvent was removed by stripping to give a product of essentially 100% NVM. The resulting product had a viscosity of 1.5 poises at 50% NVM in Varsol solution and the nonvolatile portion thereof had an average molecular weight of about 8,000.

Glass cloth of the 181 weave pattern (14 layers) containing 0.5% vinyl silane (A-172) as a finish was coated with divinyl benzene (100% purity) having a 10% molar excess of the divinyl benzene based upon the silane finish. Proportions used were as follows:

| Material: | Parts by weight |
|---|---|
| Glass cloth | 100 |
| Divinyl benzene (DVB) | 0.25 |
| Benzoyl peroxide (BPO) | 0.01 |

The divinyl benzene and benzoyl peroxide were applied to the glass as solution in ethyl ether in which the ether was allowed to evaporate at room temperature. Then the glass was heated in a nitrogen atmosphere for 40 minutes at 220° F. The purpose of this heating period was to react one double bond of the divinyl benzene molecules with the vinyl silane, leaving one double bond for reaction with the resin.

This glass cloth with the first coating of silane and second coating of divinyl benzene reacted with the silane thereon was subsequently impregnated with the following resinifiable mix.

| Compound: | Parts by weight |
|---|---|
| Copolymer as described above | 60 |
| Styrene | 40 |
| Divinyl benzene (55%) | 2 |
| t-Butyl peroxide | 2 |
| Dicumyl peroxide | 2 |

The impregnated cloth was then heated in a cavity mold for ½ hour at 300° F. and for ½ hour at 320° F. The laminate therefrom was cut into halves and one half was subjected to a post cure in a hot air oven at 350° F. for 2 hours. Laminate A is the half without a post cure; whereas Laminate B had the post cure.

This procedure was repeated except that 0.392 part of ethylene dimethacrylate was used in lieu of divinyl benzene. Laminate C herein had no post cure; in contrast, Laminate D was subjected to a post cure. Evaluation data for these laminates are listed herebelow:

| Laminate | Flexural strength (p.s.i.) | | | | |
|---|---|---|---|---|---|
| | Room temp. | 170° F. | 250° F. | 2 hrs. boil[1] | 1 week boil[1] |
| A | 60,500 | 39,500 | 16,000 | 53,000 | 44,000 |
| B | 63,500 | 47,500 | 26,000 | 55,000 | 49,000 |
| C | 57,500 | 29,500 | 15,500 | | 43,000 |
| D | 57,500 | 46,500 | 27,500 | 61,000 | 47,500 |
| Control [2] | 52,500 | 30,000 | 13,000 | 52,500 | 40,000 |
| Control [2,3] | 55,000 | 47,000 | 27,500 | 53,000 | 41,000 |

[1] Specimens ½ x 3 inches immersed in boiling water for time specified.
[2] Laminates in which no polyfunctional coating was applied to the glass cloth.
[3] Post cured as per Laminates B and D.

It is manifest herein that pretreating the glass containing a vinyl silane finish with a polyfunctional monomer and a peroxide catalyst, and heating to cause combination thereof, prior to impregnation with the resinifiable mix, results in laminates which are stronger and which have improved water resistance based on a long-term water boil.

EXAMPLE II

The following blend was prepared.

| Compound: | Grams |
|---|---|
| Vinyl toluene | 31 |
| Ethylene dimethacrylate | 10 |
| Dicumene peroxide | 1.6 |

This blend was used to wet 14 layers of 181 glass which had an A-172 vinyl silane previously coated thereon. This wetted glass was then impregnated with the mixes indicated in Table I herebelow and the impregnated cloth was then cured in a mold as per Example I. The physical properties of Laminate E (no post cure) and Laminate F (with post cure of Example I) are also listed in Table II. The control did not have the above blend coated thereon.

Table I

| Compound (grams) | E | F | Control |
|---|---|---|---|
| Copolymer of Ex. I | 95.4 | 95.4 | 95.4 |
| Vinyl toluene | 63.6 | 63.6 | 94.6 |
| Dicumyl peroxide | 3.2 | 3.2 | 4.8 |
| Di-t-butyl peroxide | 3.2 | 3.2 | 3.2 |
| Ethylene dimethacrylate | | | 10 |

Table II

| Laminate | Flexural strength (p.s.i.) | | Stress test 170°, water [1] |
|---|---|---|---|
| | Room temp. | 1 week boil | |
| E | 62,500 | 42,500 | 77 min. |
| F | 61,000 | 43,000 | 42½ hrs. |
| Control | 55,500 | 38,000 | 62 min. |
| Control [2] | 63,500 | 39,000 | 12 hrs. |

[1] Test specimen placed under 75 lbs. stress at 170° F. while immersed in water and after one hour weight was increased to 100 lbs. Times reported are times to failure.
[2] Post cured in accordance with procedure promulgated in Example I.

It is shown herein that pre-contacting the glass with the dimethacrylate in concentrated solution provides a laminate of superior water resistance.

Having set forth the general nature and specific embodiments of the present invention, the true scope is now particularly pointed out in the appended claims.

What is claimed is:

1. A process which comprises applying to the surface of a reinforcing element an unsaturated organic silane having the formula $R_nSi(OR_1)_{4-n}$, wherein R is an alkenyl group wherein the unsaturated linkage is a terminal ethylenically unsaturated carbon to carbon linkage, $n$ is a positive integer selected from the group consisting of 1, 2, and 3, and $R_1$ is selected from the group consisting or hydrogen, alkyl, or aryl, contacting the so treated surface with a poly-ethylenically unsaturated monomer containing at least 2 alkenyl groups each of which contains a terminal ethylenically unsaturated carbon to carbon linkage, and curing a resinifiable polymeric mix of normally liquid $C_4$ to $C_6$ conjugated diolefin polymer and an organic peroxide curing agent while in contact with the so treated reinforcing element to obtain a reinforced thermoset resinous composition of superior water resistance.

2. A process as in claim 1 in which the alkenyl group of the unsaturated organic silane is vinyl.

3. A process as in claim 1 in which the reinforcing element is fiberglass.

4. A process as in claim 1 wherein the poly-ethylenically unsaturated monomer is selected from the group consisting of divinyl benzene, ethylene dimethacrylate, trivinyl benzene, triethylene dimethacrylate, ethylene diacrylate, diallyl fumarate, propane trimethacrylate, diallyl phthalate, and triallyl cyanurate.

5. A process as in claim 1 wherein the normally liquid $C_4$ to $C_6$ conjugated diolefin of the resinifiable polymeric mix is a copolymer of butadiene with styrene.

6. A process as in claim 5 wherein the normally liquid $C_4$ to $C_6$ conjugated diolefin of the resinifiable polymeric mix is polybutadiene.

7. A process as in claim 1 wherein the reinforcing element is fiberglass cloth, the poly-ethylenically unsaturated monomer is divinyl benzene and the organic peroxide is dicumyl peroxide.

8. A process as in claim 1 wherein a plurality of layers of glass cloth is the reinforcing element and is impregnated with the resinifiable polymeric mix and laminated prior to curing.

9. A process as in claim 1 wherein the reinforcing element is a plurality of fiberglass strands wound about a pipe mandrel in circumferentially superimposed layers, said layers being impregnated with the resinifiable polymeric mix and then cured.

10. A process as in claim 1 wherein the poly-ethylenically unsaturated monomer contains an organic peroxide and wherein, after the application of the monomer-peroxide mixture to the reinforcing element but prior to contacting the resinifiable mix therewith, the so applied coating is partially cured.

11. A process as in claim 10 wherein the reinforcing element is a plurality of layers of glass fiber cloth and wherein the layers are impregnated with resinifiable mix, laminated, and cured.

References Cited by the Examiner
UNITED STATES PATENTS

| | | | |
|---|---|---|---|
| 2,609,319 | 9/52 | Boge | 138—141 |
| 2,763,573 | 9/56 | Biefeld | 117—126 |
| 2,767,519 | 10/56 | Bjorksten | 117—126 |
| 2,776,910 | 1/57 | Erickson et al. | 117—126 |
| 2,823,218 | 2/58 | Speier et al. | 260—448 |
| 2,841,566 | 7/58 | Grotenhuis | 117—126 |
| 2,845,364 | 7/58 | Waggoner | 117—126 |
| 2,892,972 | 6/59 | Ross | 317—258 |
| 2,902,389 | 9/59 | Keil | 117—126 XR |
| 2,952,576 | 9/60 | Wheelock et al. | 117—126 XR |
| 3,013,915 | 12/61 | Morgan | 161—193 |
| 3,062,242 | 11/62 | Vanderbilt | 117—126 |

OTHER REFERENCES

Webster's Collegiate Dictionary, G. & C. Merriam Co., Springfield, Mass., 1951.

Hackh's Chemical Dictionary, McGraw-Hill Book Co., Inc., N.Y., 1944, p. 477.

ALEXANDER WYMAN, Primary Examiner.

EARL M. BERGERT, RICHARD D. NEVIUS,
*Examiners.*